United States Patent [19]

Nakata et al.

[11] Patent Number: 5,204,767
[45] Date of Patent: Apr. 20, 1993

[54] PAY-CHANNEL TRANSMISSION SYSTEM FOR CATV

[75] Inventors: Hiroaki Nakata; Kuniaki Utsumi, both of Hirakata; Kazuki Maeda, Sakai, all of Japan

[73] Assignee: Matsushita Electric Industrial Co., Ltd., Kadoma, Japan

[21] Appl. No.: 772,486

[22] Filed: Oct. 7, 1991

[30] Foreign Application Priority Data

Oct. 9, 1990 [JP] Japan ................... 2-271130

[51] Int. Cl.$^5$ ............................................. H04J 14/02
[52] U.S. Cl. ..................................... 359/125; 358/84; 455/2
[58] Field of Search ............... 358/84, 86; 455/2, 4.2, 455/61, 6.2; 359/125, 137

[56] References Cited

U.S. PATENT DOCUMENTS

| | | | |
|---|---|---|---|
| 3,751,670 | 8/1973 | Grodner | 359/125 |
| 3,899,633 | 8/1975 | Sorenson | 455/2 |
| 4,074,310 | 2/1978 | Hurneg | 455/2 |
| 4,491,983 | 1/1985 | Pinnow | 359/173 |
| 4,891,694 | 1/1990 | Way | 359/125 |
| 4,901,367 | 2/1990 | Nicholson | 455/6.2 |
| 5,008,934 | 4/1991 | Endoh | 455/6.2 |

Primary Examiner—Edward L. Coles, Sr.
Assistant Examiner—Leslie Pascal
Attorney, Agent, or Firm—Ratner & Prestia

[57] ABSTRACT

A pay-channel transmission system for a CATV has an optical transmission unit and an optical receiver unit. The optical transmission unit includes pay-channel television signals optically multiplexed by a $\lambda_1$ wavelength semiconductor laser and non-pay-channel television signals optically multiplexed by a $\lambda_2$ wavelength semiconductor laser. The optical receiver unit includes an optical filter for filtering the $\lambda_1$ wavelength data. Thus, a non-subscriber having the optical filter is prevented from receiving the pay-channel television signals, and a subscriber having no optical filter is able to receive both the pay-channel television signals and non-pay-channel television signals.

5 Claims, 5 Drawing Sheets

PAY-CHANNEL TRANSMISSION SYSTEM FOR CATV

BACKGROUND OF THE INVENTION

1. Field of the Invention

The present invention relates to a CATV pay-channel transmission method which distributes paid-subscriber television signals to subscribers.

2. Description of the Prior Art

In conventional CATV systems using a standard coaxial cable transmission path unauthorized reception of pay-channel programming is prevented by the transmitter scrambling out-going pay-channel television signals. A signal receiver is provided to CATV subscribers to descramble the received signal using various methods, including a "key" which unlocks the scrambling format or an electrical filter which passes only the paid-for channels. Such methods have been described in "*CATV in the satellite broadcasting age*", p. 252, (1987), compiled by Cable Broadcasting Section, Broadcasting Administration Department, (Japanese) Ministry of Posts and Telecommunications.

However, there has always been the possibility of unauthorized reception of pay-channel programming enabled by tampering with the electrical circuits of the signal receiver. Picture deterioration in the descrambled, demodulated signal has also been a problem. On the other hand, unauthorized reception of digitally processed scrambled signals is difficult and there is no degradation of the demodulated signal, but the descrambler cost is higher due to the need for A/D and D/A converters.

SUMMARY OF THE INVENTION

Therefore, an object of the present invention is to provide a pay-channel transmission method whereby unauthorized reception is difficult and there is no picture deterioration.

To achieve the aforementioned object, a pay-channel transmission method according to the present invention comprises at the transmitting side a first optical transmitter which transmits a pay-channel television signal by means of a $\lambda_1$ wavelength semiconductor laser, and a second optical transmitter which transmits other television signals by means of a $\lambda_2$ wavelength semiconductor laser, and comprises at the optical signal receiving side one optical signal receiver and an optical means to block the $\lambda_1$ wavelength, thereby blocking the pay-channel optical signal.

Alternatively, two semiconductor lasers with differing bandwidths may be used to transmit the pay-channel television signal by means of a first semiconductor laser while wavelength multiplexing another television signal by means of a second semiconductor laser, and an optical divider which can be inserted and removed may be provided in the optical signal receiver.

In addition, the transmitter may comprise a first optical transmitter to frequency multiplex pay-channel television signals in the frequency range $f_1$-$f_k$ and non-pay-channels in a frequency range other than $f_1$-$f_k$ for optical transmission by means of a $\lambda_1$ wavelength semiconductor laser, and a second optical transmitter which optically transmits an FDM signal, which is a carrier wave frequency multiplexed to the same $f_1$-$f_k$ frequency range, by means of a $\lambda_2$ wavelength semiconductor laser, said $\lambda_2$ wavelength being in the same wavelength band as the $\lambda_1$ wavelength, and the receiver may comprise an optical signal receiver and an optical means to block the wavelength $\lambda_2$.

It is thus possible to block the wavelength carrying the pay-channel programming and thus interfere with the pay channel, thereby preventing unauthorized reception.

The present invention differs completely from conventional scrambling methods used to process an electrical signal, and unauthorized reception enabled by tampering with the electrical circuitry of the receiver is difficult because interference is applied at the optical signal stage by means of such optical components as optical dividers and interference filters. Furthermore, because optical interference may be combined with conventional electrical signal scrambling, protection against unauthorized reception is doubled.

In addition, distribution of deterioration-free video signals to pay-channel subscribers can be accomplished quickly and economically by inserting or removing an optical component, thereby providing greater practical effectiveness.

BRIEF DESCRIPTION OF THE DRAWINGS

The present invention will become more fully understood from the detailed description given below and the accompanying diagrams wherein.

DESCRIPTION OF PREFERRED EMBODIMENTS

Figure 1:
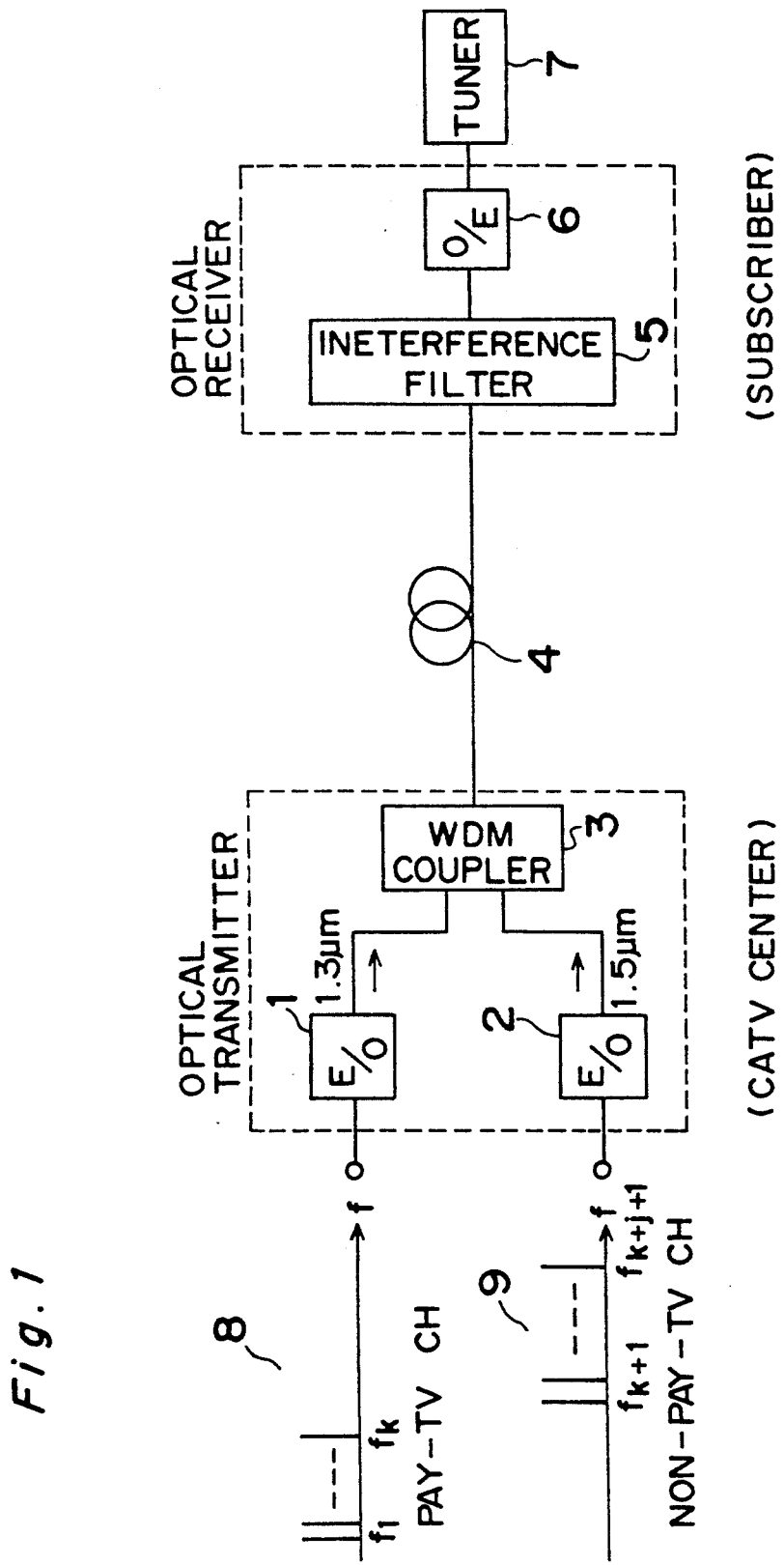
FIG. 1, FIG. 2, FIG. 4, and FIG. 5 are block diagrams of the preferred embodiments of the present invention.

The preferred embodiments of the present invention are described hereinbelow with reference to the accompanying figures, whereof FIG. 1 is a block diagram of a first embodiment. As shown in FIG. 1, this embodiment comprises an (electro-optical) optical transmitter 1 comprising a 1.3 $\mu$m wavelength semiconductor laser, an (electro-optical) optical transmitter 2 comprising a 1.5 $\mu$m wavelength semiconductor laser, an optical combiner 3, a single mode optical fiber for transmission 4, an interference filter 5, an (opto-electric) optical receiver 6, and a tuner 7.

The interference filter 5 blocks the 1.3 $\mu$m wavelength. The optical element used in the optical receiver 6 is a Ge element with uniform sensitivity in the 1.3–1.5 $\mu$m wavelength band.

As indicated by number 8 in FIG. 1, the pay-channel television signals are amplitude modulated, frequency multiplexed with a carrier wave in the band $f_1$-$f_k$ and converted to a 1.3 $\mu$m wavelength optical signal by the optical transmitter 1, and then sent to the Wavelength Division Multiplexing (WDM) coupler 3. Non-pay-channel television signals are amplitude modulated, frequency multiplexed with a carrier wave in the band $f_{k+1}$-$f_{k+j+1}$ and converted to a 1.5 $\mu$m wavelength optical signal by the other optical transmitter 2, and then sent to the WDM coupler 3.

The optical signal combined by the WDM coupler 3 is transmitted via the optical fiber transmission cable 4 to the subscriber receiver and input to the interference filter 5 thereof. The 1.5 $\mu$m wavelength optical signal which can pass through the interference filter 5 is then converted to an electrical signal by the optical receiver 6. The subscriber can thus tune in and view programs which are not carried on a pay-channel, but cannot view any pay-channel transmissions.

When the subscriber contracts for pay-channel programming, both the 1.3 μm and 1.5 μm wavelength optical signals can be input to the optical receiver 6 by simply removing the interference filter 5, and all channels transmitted from the CATV broadcast center can thus be viewed. This is dependent upon the wavelength sensitivity of the optical receiver element having an approximately constant wavelength band and the frequency assignments of pay-channel and non-pay-channel programming being different. Because the pay-channel television signals are blocked by the interference filter 5 in this embodiment, there is theoretically no deterioration of the signal quality when the scrambled electrical signal is descrambled on the receiving side.

An alternative embodiment of the present invention is described hereinbelow with reference to the block diagram in FIG. 2. It is to be noted that those components which are functionally equivalent to components in FIG. 1 are indicated with like reference numbers and further detailed description thereof is omitted in the following.

Figure 2:
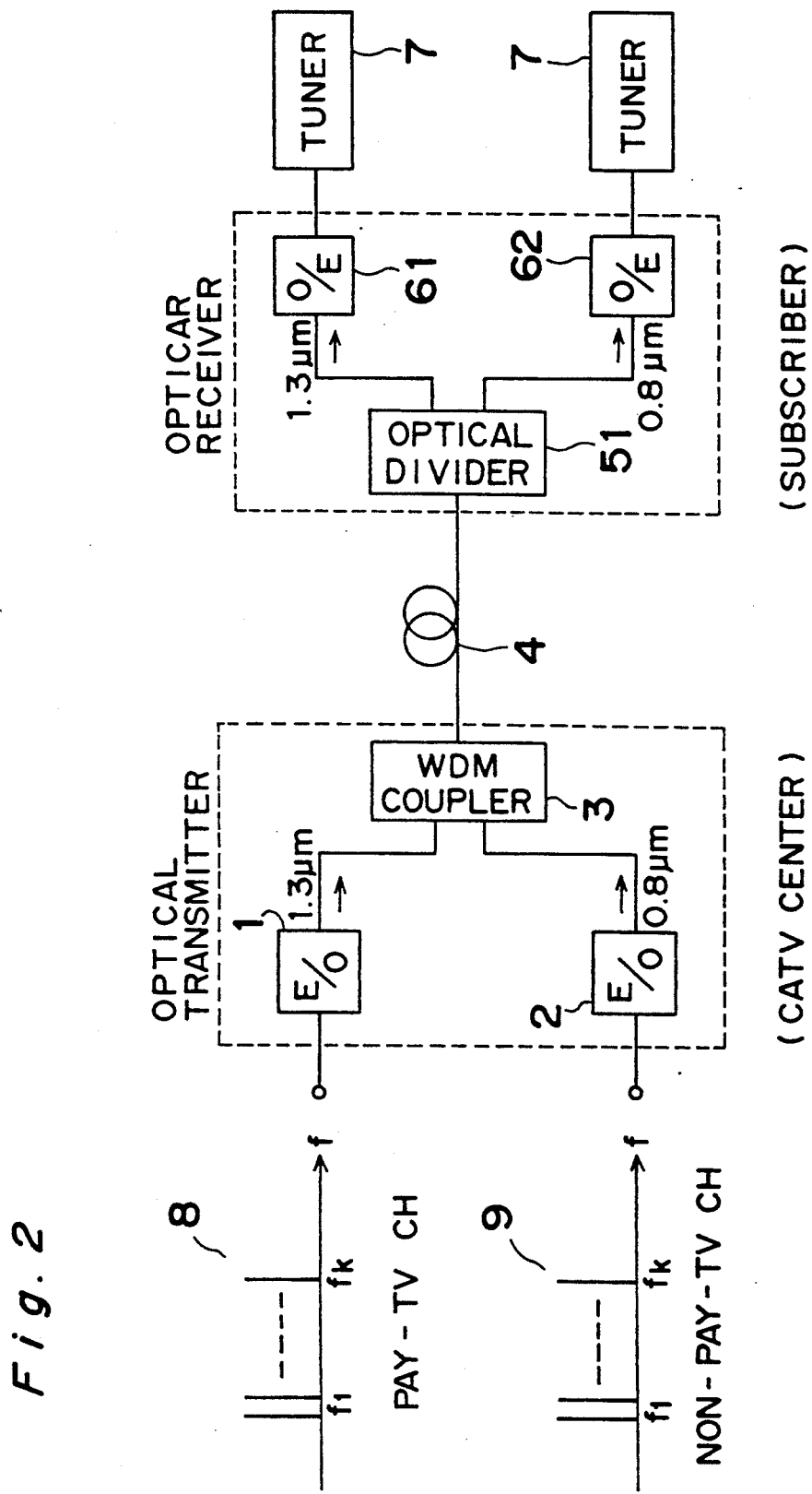
Figure 3:
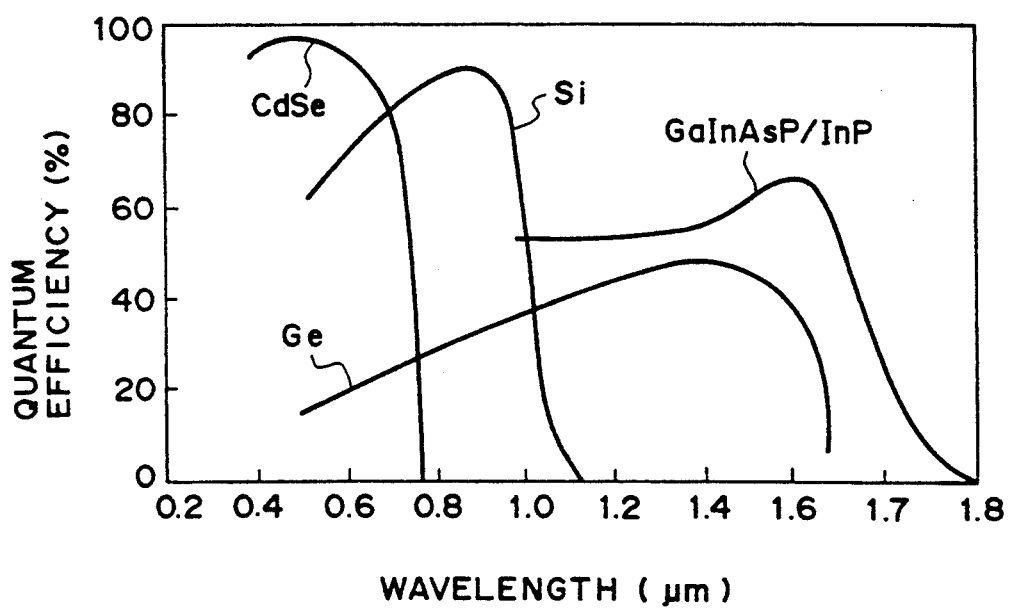
FIG. 3 is a diagram illustrating the wavelength characteristics of an optical receiver element.

As shown in FIG. 2, this embodiment comprises an (electro-optical) optical transmitter 1 which transmits a frequency multiplexed pay-channel television signal (FDM signal) by means of a long (e.g., 1.3 μm) wavelength band semiconductor laser, an (electro-optical) optical transmitter 2 comprising a short wavelength (e.g., 0.8 μm) band semiconductor laser which transmits an FDM signal frequency multiplexing the other channels, a WDM coupler 3 which combines the short and long wavelength band signals, an optical divider 51 which divides the short and long wavelength band optical signals, an (opto-electric) optical receiver 61 using a Ge optical receiver element for the long wavelength band, and an (opto-electric) optical receiver 62 using an Si optical receiver element for the short wavelength band. FIG. 3 is a diagram illustrating the wavelength sensitivity characteristics of the optical receiver elements (This diagram is introduced in *Introduction to optical fiber communications*, Suematsu, Yasuhara, et al., p. 104; The OHM-Sha Ltd.)

The pay-channel FDM signal is input to the optical transmitter 1, converted to a 1.3 μm wavelength optical signal, and output to the optical combiner 3. The FDM signal for the other channels is similarly input to the optical transmitter 2, converted to a 0.8 μm wavelength optical signal, and output to the WDM coupler 3. The WDM coupler 3 combines the 0.8 μm and 1.3 μm signals and transmits the combined signal via the optical fiber transmission cable 4. The broadcast signal is input to the optical divider 51, which divides the signal into long and short wavelength band optical signals, which are respectively received by the long wavelength band optical receiver 61 and the short wavelength band optical receiver 62 and converted to electrical signals.

If the subscriber has not contracted for pay-channel service, the optical divider 51 is removed and the optical fiber transmission cable 4 is connected directly to the short wavelength optical receiver 62. Both the long and short wavelength optical signals are thus input to the optical receiver 62, but because the sensitivity of the Si element therein is extremely low to the long wavelength band as shown in FIG. 3, the long wavelength band optical signal cannot be received. Thus, the non-subscriber can be prevented from viewing pay-channel programming.

Figure 4:
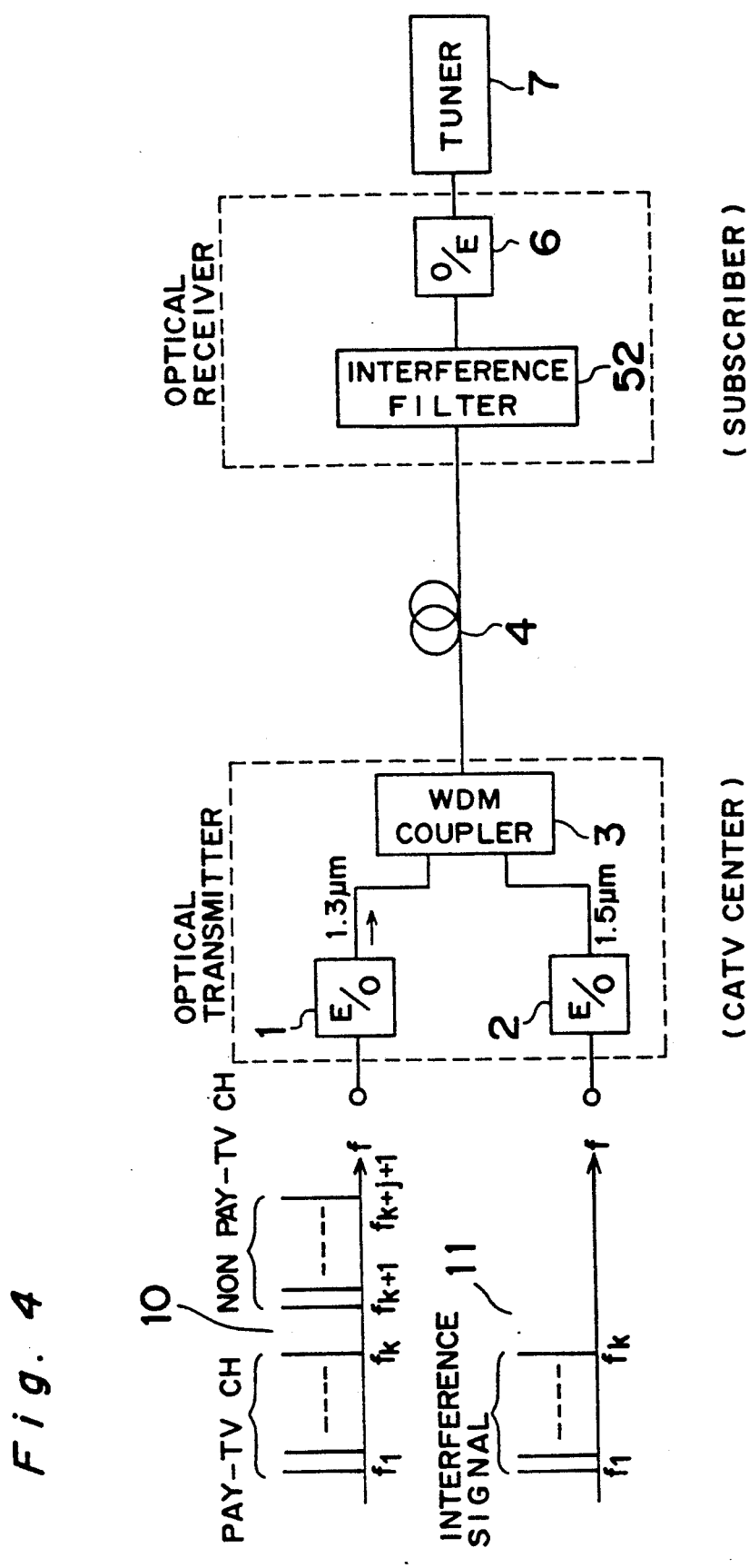

FIG. 4 is a block diagram of an alternative embodiment of the present invention. It is to be noted that those components which are functionally equivalent to components in FIG. 1 and FIG. 2 are indicated with like reference numbers and further detailed description thereof is omitted in the following.

As shown in FIG. 4, this embodiment comprises (electro-optical) optical transmitters 1 and 2, a WDM coupler 3, an optical fiber transmission cable 4, an interference filter 52, and an (opto-electric) optical receiver 6.

As indicated by reference number 10 in FIG. 4, the FDM signal, which is the pay-channel television signals frequency multiplexed to the $f_1$-$f_k$ frequency band and frequency multiplexed with the other television signals to the $f_{k+1}$-$f_{k+j+1}$ frequency band, is input to the optical transmitter 1, converted to a 1.3 μm wavelength optical signal, and then output to the WDM coupler 3. The FDM signal 11, which is an unmodulated carrier wave frequency multiplexed to the $f_1$-$f_k$ frequency range, is input as an interference signal to the other optical transmitter 2, converted to a 1.5 μm wavelength optical signal, and output to the optical combiner 3.

The optical signal generated by the WDM coupler 3 is transmitted to the optical receiver by the optical fiber transmission cable 4, the interference filter 52 of which passes only the 1.3 μm optical signal to the optical receiver 6 for conversion to an electrical signal.

The interference filter 52 is inserted to the optical receiver of pay-channel subscribers, thus enabling viewing of all channels broadcast from the CATV center. The interference filter 52 is not provided in the optical receivers of non-subscribers to pay-channel service, and the optical fiber transmission cable 4 is therefore connected directly to the optical receiver 6.

When the interference filter 52 is not present, the optical signal output by the optical transmitter 2 is also input to the optical receiver 6. If a Ge element is used for the optical element in the receiver, sensitivity is constant to optical signals in the 1.3 μm–1.5 μm wave band, and the optical signals of both wavelengths are thus converted to an electrical signal. Both FDM signals 11 and 10 are thus mixed in this electrical signal. Because the unmodulated carrier wave in the interference signal FDM 11 occupies the same frequency position as the pay-channel in the other FDM signal 10, the image quality of pay-channel programs deteriorates.

Figure 5:
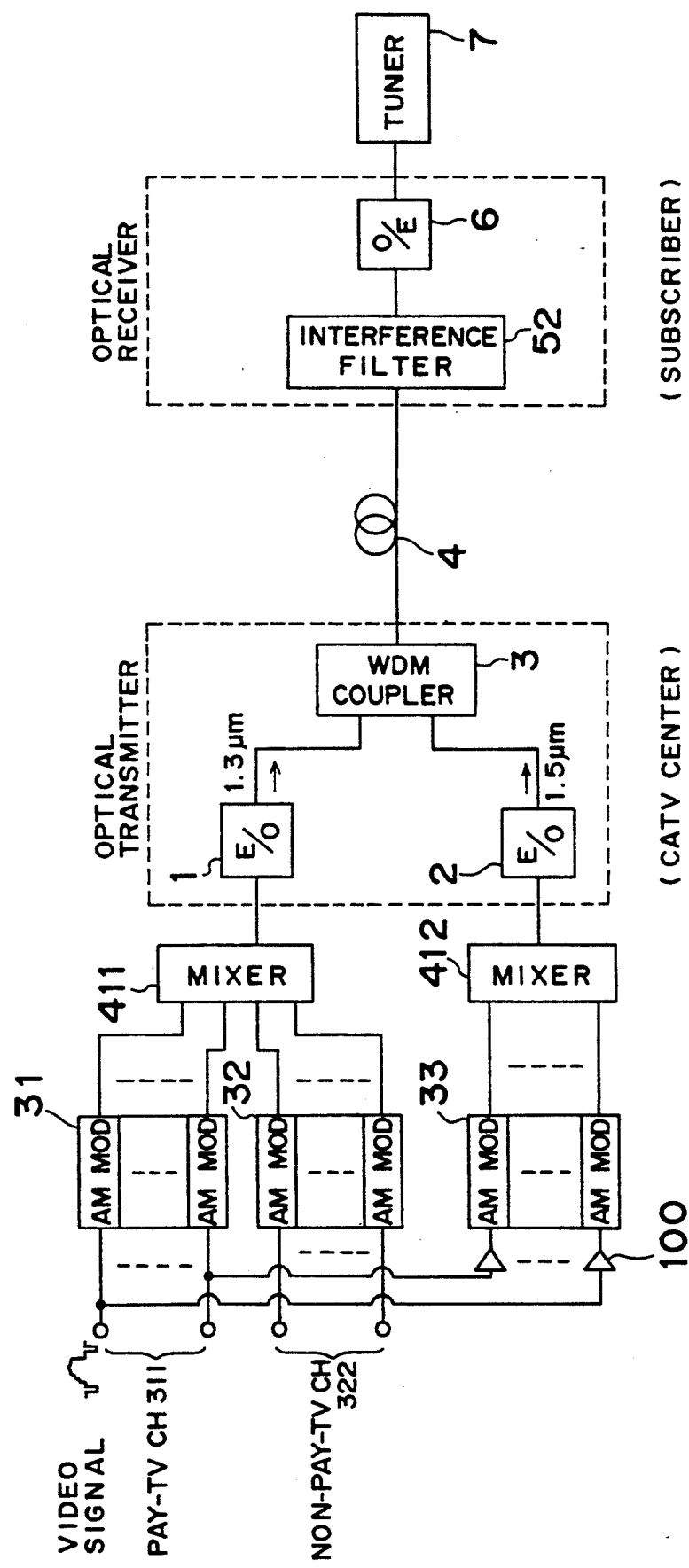

An alternative version of this embodiment is shown in the block diagram of FIG. 5, wherein reference numbers 31, 32, and 33 are AM modulators, 100 is an inversion amplifier, and 411 and 412 are mixers.

The video signals for the pay channels are input from input terminals 311 to the AM modulator 31 and output to the mixer 411. The video signals for the other channels are input from input terminals 322 to the AM modulator 32 and output to the mixer 411. The mixer 411 outputs the frequency multiplexed AM-FDM signal to the 1.3 μm optical transmitter 1.

The video signals for the pay channels are simultaneously input to the inversion amplifiers 100, modulated by an AM modulator 33, and output to the mixer 412 for frequency multiplexing. The mixer 412 then outputs the multiplexed signal to the 1.5 μm optical transmitter 2. It is to be noted that the frequency assignments of the carrier wave in the first and last AM modulators 31 and 33 are the same.

The optical signals thus obtained from the optical transmitters 1 and 2 are mixed by the WDM coupler 3 and transmitted over the optical fiber transmission cable 4.

The interference filter 52 is inserted to the optical receiver of pay-channel subscribers, passing only the 1.3 μm wavelength optical signal and removing the 1.5 μm interference optical signal, and thus enabling viewing of all channels broadcast from the CATV center. Because the interference filter 52 is not provided in the optical receivers of non-subscribers to pay-channel service, setting the tuner 7 to a pay-channel position causes demodulation of the video signal in which the optical signals from both optical transmitters 1 and 2 are combined.

While the video signals obtained from the two optical receivers are the same, the polarities thereof are inverted, thus resulting in an irregular synchronizing signal in the mixed video signals. As a result, the channel cannot be viewed.

While an AM-FDM signal was used by way of example in the above description, the same effect can be obtained by modulating the video signal with another modulation method (e.g., FM) before transmission. In addition, the same effect can be obtained whether applied to a video signal, digital signal, PSK or FSK modulated optical transmission.

As will be known from the above description, unauthorized reception of pay-channel broadcasts can be effectively prevented by simply removing the interference filter 52. Furthermore, pay-channel programming can be broadcast without deteriorating the picture quality of the pay-channel programming when the interference filter 52 is inserted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pay-channel transmission system for a CATV comprising:
   (I) an optical transmission unit comprising:
      a first optical signal generator for generating a frequency multiplexed pay-channel television signal which is multiplexed to an $f_1$-$f_k$ frequency band and outputs a first optical signal by means of a $\lambda_1$ wavelength semiconductor laser;
      a second optical signal generator for generating a frequency multiplexed non-pay-channel television signal which is multiplexed to a frequency band other than $f_1$-$f_k$ and outputs a second optical signal by means of a $\lambda_2$ wavelength semiconductor laser; and
      an optical combining means for combining said first and second optical signals; and
   (II) an optical receiver unit for receiving the optical signal transmitted from the optical transmission unit comprising:
      an optical blocking means for blocking said first optical signal and for transmitting only said second optical signal,
      whereby a non-subscriber having said optical blocking means is prevented from receiving the first optical signal, and a subscriber having no optical blocking means is able to receive both the first and second optical signals.

2. A pay-channel transmission system for a CATV comprising:
   (I) an optical transmission unit comprising:
      a first optical signal generator for generating a frequency multiplexed pay-channel television signal which is multiplexed to a first frequency band and outputs a first optical signal at a first frequency range by a first semiconductor laser;
      a second optical signal generator for generating a frequency multiplexed non-pay-channel television signal which is multiplexed to a second frequency band and outputs a second optical signal at a second frequency range by a second semiconductor laser; and
      an optical combining means for combining said first and second optical signals; and
   (II) an optical receiver unit for receiving the optical signal transmitted from the optical transmission unit comprising:
      an optical divider means for separating said first and second optical signals; and
      first converting means sensitive to said first frequency range for converting said first optical signal to a first electric signal;
      second converting means sensitive to said second frequency range for converting said second optical signal to a second electric signal;
      whereby a non-subscriber having no optical divider means and first converting means is prevented from receiving the first electric signal, and a subscriber having said optical divider means and first converting means, as well as the second converting means, is able to receive both the first and second electric signal.

3. A pay-channel transmission system for a CATV comprising:
   (I) an optical transmission unit comprising:
      a first optical signal generator for generating an optically modulated television signal modulated by a $\lambda_1$ wavelength semiconductor, said television signal being a combination of pay-channel television signal and non-pay-channel television signal which are separatably added to each other;
      a second optical signal generator for generating an optically modulated interference signal modulated by a $\lambda_2$ wavelength semiconductor, said interference signal having a characteristic to interfere with said pay-television signal;
      an optical combining means for combining said optically modulated television signal and said optically modulated interference signal; and
   (II) an optical receiver unit for receiving the optical signal transmitted from the optical transmission unit comprising:
      an optical blocking means for blocking said optically modulated interference signal and for transmitting only said optically modulated television signal,
      whereby a non-subscriber having no blocking means receives both the optically modulated interference signal and the optically modulated television signal and thus is prevented from receiving the pay-channel television signal, and a subscriber having said blocking means is able to receive the pay-channel television signal, as well as the non-pay-channel television signal.

4. A pay-channel transmission system for a CATV comprising:
(I) an optical transmission unit comprising:
a first optical signal generator for generating an optically modulated television signal modulated by a $\lambda_1$ wavelength semiconductor, said television signal being a combination of pay-channel television signal which is frequency multiplexed to an $f_1-f_k$ frequency band and non-pay-channel television signal which is frequency multiplexed to a frequency band other than $f_1-f_k$,
a second optical signal generator for generating an optically modulated interference signal modulated by a $\lambda_2$ wavelength semiconductor, said interference signal being frequency multiplexed to the $f_1-k_k$ frequency band,
an optical combining means for combining said optically modulated television signal and said optically modulated interference signal; and
(II) an optical receiver unit for receiving the optical signal transmitted from the optical transmission unit comprising:
an optical blocking means for blocking said optically modulated interference signal and for transmitting only said optically modulated television signal,
whereby a non-subscriber having no blocking means receives both the optically modulated interference signal and the optically modulated television signal and thus is prevented from receiving the pay-channel television signal, and a subscriber having said blocking means is able to receive the pay-channel television signal, as well as the non-pay-channel television signal.

5. A pay-channel transmission system for a CATV comprising:
(I) an optical transmission unit comprising:
a first optical signal generator for generating an optically modulated television signal modulated by a $\lambda_1$ wavelength semiconductor, said television signal being a combination of pay-channel television signal and non-pay-channel television signal both of which are modulated by a predetermined modulation system;
a second optical signal generator for generating an optically modulated interference signal modulated by a $\lambda_2$ wavelength semiconductor, said interference signal being an inverse of said pay-channel television signal which is modulated by said predetermined modulation system;
an optical combining means for combining said optically modulated television signal and said optically modulated interference signal; and
(II) an optical receiver unit for receiving the optical signal transmitted from the optical transmission unit comprising:
an optical blocking means for blocking said optically modulated interference signal and for transmitting only said optically modulated television signal,
whereby a non-subscriber having no blocking means receives both the optically modulated interference signal and the optically modulated television signal and thus is prevented from receiving the pay-channel television signal, and a subscriber having said blocking means is able to receive the pay-channel television signal, as well as the non-pay-channel television signal.

* * * * *